(12) United States Patent
Chopart

(10) Patent No.: US 8,732,812 B2
(45) Date of Patent: May 20, 2014

(54) METHOD OF OPERATING AN ITEM OF ON-BOARD EQUIPMENT, ASSOCIATED EQUIPMENT AND AIRCRAFT COMPRISING SUCH EQUIPMENT

(75) Inventor: Stephane Chopart, Vacquiers (FR)

(73) Assignee: Airbus Operations, Toulouse (FR)

( * ) Notice: Subject to any disclaimer, the term of this patent is extended or adjusted under 35 U.S.C. 154(b) by 790 days.

(21) Appl. No.: 12/575,781

(22) Filed: Oct. 8, 2009

(65) Prior Publication Data

US 2010/0098243 A1    Apr. 22, 2010

(30) Foreign Application Priority Data

Oct. 20, 2008 (FR) .................................. 08 57125

(51) Int. Cl.
*G06F 21/00* (2013.01)
*G06F 21/57* (2013.01)
*G06F 21/31* (2013.01)
*H04L 9/08* (2006.01)
*H04L 9/32* (2006.01)
*H04L 29/06* (2006.01)

(52) U.S. Cl.
CPC .............. *G06F 21/572* (2013.01); *G06F 21/31* (2013.01); *G06F 21/575* (2013.01); *G06F 21/57* (2013.01); *H04L 9/0891* (2013.01); *H04L 9/3247* (2013.01); *H04L 9/3263* (2013.01); *H04L 9/3271* (2013.01); *H04L 9/3234* (2013.01); *H04L 63/0435* (2013.01); *H04L 2463/061* (2013.01); *H04L 2209/84* (2013.01)
USPC .................. 726/9; 726/22; 713/172; 713/186; 705/13

(58) Field of Classification Search
CPC ..... G06F 21/31; G06F 21/575; G06F 21/572; H04L 9/0891; H04L 9/3247; H04L 9/3271; H04L 9/3234; H04L 9/3263; H04L 63/0435; H04L 63/0869; H04L 2209/84
USPC ............................................................ 726/9
See application file for complete search history.

(56) References Cited

U.S. PATENT DOCUMENTS 6,071,316 A * 6/2000 Goossen et al. .............. 717/126
(Continued)

FOREIGN PATENT DOCUMENTS

DE        101 28 305 A 1        12/2002

OTHER PUBLICATIONS

Richard V. Robinson, et al., "Challenges for IT Infrastructure Supporting Secure Network-Enabled Commercial Airplane Operations", AIAA Infotech Aerospace Conference, 2007, XP007908347, pp. 1-7.

(Continued)

*Primary Examiner* — David Pearson
*Assistant Examiner* — Narciso Victoria
(74) *Attorney, Agent, or Firm* — Oblon, Spivak, McClelland, Maier & Neustadt, L.L.P.

(57) ABSTRACT

Equipment items installed on board vehicles and more particularly to a method for operating such an on-board equipment item, the method including an on-board micro software program that is executed during power-up of the on-board equipment item to achieve secure processing with the aid of sensitive security data. In particular, the method includes connecting a secure module including the sensitive security data necessary for secure processing to the on-board equipment item, and authenticating the secure module by the micro software, in such a way as to furnish the micro software with the sensitive security data for subsequent execution of the secure processing.

20 Claims, 6 Drawing Sheets

(56) References Cited

U.S. PATENT DOCUMENTS

| | | | |
|---|---|---|---|
| 6,581,159 B1* | 6/2003 | Nevis et al. | 713/2 |
| 7,698,737 B2* | 4/2010 | Schwan et al. | 726/19 |
| 2002/0002683 A1* | 1/2002 | Benson et al. | 713/194 |
| 2004/0025021 A1 | 2/2004 | Aikawa et al. | |
| 2005/0039006 A1 | 2/2005 | Stelling et al. | |
| 2008/0172740 A1 | 7/2008 | Kondo | |

OTHER PUBLICATIONS

Richard V. Robinson, et al., "Impact of Public Key Enabled Applications on the Operation and Maintenance of Commercial Airplanes" AIAA Aviation Technology Integration, and Operations (ATIO) Conference, Belfast, Northern Ireland, Sep. 18-20, 2007, XP007908365, 10 pages.

* cited by examiner

METHOD OF OPERATING AN ITEM OF ON-BOARD EQUIPMENT, ASSOCIATED EQUIPMENT AND AIRCRAFT COMPRISING SUCH EQUIPMENT

BACKGROUND OF THE INVENTION

The present invention relates to equipment items installed on board vehicles and more particularly to a method for operating such an on-board equipment item, comprising an on-board micro software program that is executed to achieve at least one secure processing with the aid of sensitive security data.

The equipment items installed on board vehicles traditionally have a physical part, also known as "hardware" and a software part composed of programs, or "software", executed by the hardware part. These different hardware and software components are identified by an identification number, or part number, especially in the aeronautics sector.

The hardware components may contain base software programs, such as BIOS, an operating system or a startup sequence ("boot" sequence according to English terminology).

These software programs generally have low application level and are integrated into a permanent memory. Any modification made to them is considered to be a "hardware" intervention on the affected component, necessitating a new certification cycle, because the new software code may modify the operation of the equipment item and in this regard must be verified and validated. This modification is known as a "hardware modification".

Because a new hardware certification cycle is costly from the viewpoint of economics and time, such a hardware modification is considered to be a handicap in terms of operability and costs.

Thus it is commonly provided that only the executable software code, which is assumed will change not at all or only very little during the life of the vehicle, will be integrated into a hardware component. This software code integrated into the hardware component is also known as micro software or firmware according to a widely used Anglicism. The expressions "internal software", "on-board software" or "operating software" are also used to designate this micro software.

Micro software is generally limited to the association of a startup program ("Boot software" according to English terminology) for starting up the equipment item and a resident program ("Resident software" according to English terminology) comprising some basic functions. These two elements of the micro software are executed successively during power-up of the equipment item in which they are integrated.

The interest of the invention lies in a micro software program capable of executing a secure processing operation by using sensitive security data.

By way of example in the aeronautics sector, a micro software program is reduced to the strict minimum and includes only communication and data-loading functions. These functions make it possible to load, from a data loader or a network loading server, operating data (software programs, applications and/or raw data) that impart to the on-board equipment item the functionalities to which it is dedicated.

These data are generally compiled and grouped in the form of files or blocks that can be downloaded to the aircraft in conformity with a standard provided for civil aviation. These files or blocks that the micro software loads can be referred to indiscriminately as "loads".

To avoid compromising the operation of the aircraft, the files to be downloaded are secured by electronic (or digital) signatures, for example by means of a public key infrastructure (PKI), with which their authenticity can be verified.

The use of a PKI infrastructure and of corresponding asymmetric keys is made necessary for an aeronautical use, for example, by the fact of the plurality of entities involved in the operation of a type of aircraft: numerous file editors, numerous airline companies receiving these files, etc. Infrastructures having symmetric keys could not have been advisable, because these keys would have been shared by an excessive number of persons.

The files to be loaded, and especially their digital signatures, are then verified by the on-board equipment item before they are downloaded to the aircraft.

Patent Application FR 2912578 in particular describes digital signature mechanisms adapted to the aeronautics sector.

Nevertheless, to permit some flexibility in use of these signature mechanisms, such as an update, the tools necessary for these verifications (electronic keys, associated signature verification software programs) are integrated into one or more files to be downloaded, known as "configuration files". This file constitutes or these files constitute the first data loaded into the on-board equipment item, since it is necessary for loading other files. This or these initial configuration file or files of the on-board equipment item is or are therefore designated as being the "first" file to be downloaded or "first configuration load". For evident reasons of system security, this first file is also secured.

However, verification of this first "load" constitutes a difficulty, because the on-board equipment item is limited at that moment to the simple resident software as far as functionalities are concerned.

Referring to FIG. 1, there is illustrated the current process of loading files to be downloaded to aircraft in service.

On-board equipment item 10, which may be an avionic equipment item, for example, comprises among other features a set of hardware components provided with a micro software program 12, and software programs or data stored in a storage memory 14 while they are being downloaded, and a random-access memory 16, of SDRAM type, for example, for execution of software programs by executing means of on-board equipment item 10.

During startup of on-board equipment item 10, boot sequence 20 of micro software program 12 is loaded into random-access memory 16 then is executed to verify the state of the on-board equipment item.

If the first configuration data, or in other words the "first configuration load" 30 are not present in storage memory 14 of on-board equipment item 10, boot sequence 20 launches execution of resident software 22, which in turn is loaded into random-access memory 16.

In its binary code, resident software 22 comprises cryptological tools 24 of public key infrastructure type, especially to verify the signature of first "configuration load" 30, which contains the sensitive data (PKI parameters) for verifying the other files 34 to be downloaded. These tools are in particular a root certificate, a hash algorithm, a signature algorithm and a binary software code for electronic signature verification. Resident software 22 also comprises tools for communication with a centralized data loader (not illustrated), for example via a communication network, from which equipment item 10 is able to recover the files to be downloaded.

In this way, first "configuration load" 30 signed in conformity with a public key infrastructure PKI is verified by resident software 24 according to traditional PKI signature verification mechanisms. This first configuration file is loaded into storage memory 14 only after positive verification, or in other words when the origin and integrity of the file are correct.

Once first "configuration load" 30 and therefore tools 32 for verification of the signature of the other files 34 to be downloaded, especially PKI parameters (certificates, algorithms) and corresponding software programs are available to it, on-board equipment item 10 proceeds to verification of the subsequent files 34 and to loading them in memory 14 from the data loader, when the verification of first "load" 30 by means of the PKI parameters is positive.

These other downloaded files 34 comprise diverse applications or operating data for equipment item 10.

In this configuration, the sensitive data, here the PKI parameters for secure processing of verification of the first configuration file to be downloaded, are contained in the binary code of resident software 22.

During subsequent startups of the on-board equipment item, the latter launches boot sequence 20 and verifies the presence of first configuration file 30 in permanent memory 14. Since the first configuration file of equipment item 10 is present (loaded during the first startup of equipment item 10), resident software 22 is ignored.

The PKI parameters and software tools 32 necessary for verification of the electronic signature of the subsequent files 34 are loaded into SDRAM memory 16 from the data of first configuration file 30 stored in permanent memory 14. Downloading of subsequent files 34 from the data loader is identical to the process described hereinabove.

However, the PKI parameters necessary for verification of the files may evolve in time, for example for the following reasons:
- a root certificate has a limited life, often of 20 years, which is clearly shorter than the useful life of an aircraft on which equipment item 10 is installed;
- the algorithms are subjected to mathematical attacks that may be employed by virtue of increasing computing power. Thus these algorithms are modified as a function of advances in cryptoanalysis.

In this way the electronic signature solution for the operating files will go through several successive versions: N, N+1, etc.

To facilitate migrations from one version to another, a transition period is decided for a duration of some months or years whenever possible. During this period, the signature versions N and N+1 coexist. At the end of this period, the use of version N is prohibited, since it is considered to be unsafe:
- the initial files signed N must no longer be used, because of the loss of total confidence in signatures in the previous version,
- only new files signed N+1 may be generated, and must be used.

When this evolution affects signature verification tools 32 used for loading subsequent files 34, an update of first configuration file 30 in on-board equipment item 10 is conducted by downloading a new corrective file signed N (also known as "patch") and containing the new PKI parameters.

By virtue of the new PKI parameters of configuration file, updated by patch, subsequent files 34, signed with the new signature version N+1, can be verified before being installed in on-board equipment item 10.

In the case that on-board equipment item 10 is reset to zero, entailing erasure of first configuration file 30 from memory 14, a new first configuration file 30 comprising verification tools 32 in version N+1 must be available from the data loader.

When the evolution of electronic signature mechanisms affects signature verification tools 24 used for loading first configuration file 30, the new first configuration file 30 to be loaded and intended for on-board equipment item 10 is signed from then on in version N+1.

In its binary code, however, resident software 22 comprises only the PKI parameters for verifying a signature of configuration file 30 in version N.

In this configuration, when on-board equipment item 10 is reset to zero and first configuration file 30 must be reloaded, verification of this first file cannot be achieved because of incompatibility of the signature versions. Consequently, downloading of this file 30 and of subsequent files 34 is blocked.

The hardware configuration of equipment item 10 must therefore be modified to integrate the PKI parameters in version N+1 into resident software 22. As mentioned hereinabove, this evolution or update of PKI parameters 24 modifies the on-board software code and necessitates a new cycle of certification of equipment item 10, with the consequence in general that it must be removed and returned to the supplier of equipment item 10.

In general, when an on-board equipment item comprises micro software capable of executing a secure processing, and this micro software integrates the sensitive security data used by this processing, it is necessary to undertake a new certification of the equipment item when it is desired to modify these sensitive data.

SUMMARY OF THE INVENTION

The objective of the present invention is to overcome this disadvantage by providing to host these sensitive data in secure manner in an adapted secure module.

To this end, the invention relates in particular to a method for operating an on-board equipment item provided with micro software capable of being executed during power-up of the on-board equipment item in order to achieve a secure processing by the use of sensitive security data, the method comprising connecting a secure module comprising the said sensitive security data necessary for the said secure processing to the said on-board equipment item, and authenticating the secure module by the micro software, so as to furnish the said micro software with the said sensitive security data for subsequent execution of the said secure processing.

In this way the sensitive data, such as the PKI parameters mentioned hereinabove, are not integrated directly into the binary code of the software resident in the equipment item. In particular, they are stored in an external secure module that can be removed from the said equipment item.

As a result, the micro software achieves secure access to these sensitive data in order to execute the traditional secure processing.

The use of a secure module for storage of these sensitive data as well as authentication thereof guarantees a degree of security sufficient to avoid compromising the equipment item. In particular, this authentication makes it possible to prevent a third party from loading a corrupted first configuration file, which would permit subsequent "secure" loading of "loads" that themselves are corrupted.

By virtue of the invention, the security for loading the first configuration file is maintained while the operability of the on-board system is enhanced, since an update of the sensitive data, such as the PKI parameters, can be executed on the secure module without intervening in the on-board equipment item by a hardware modification.

By way of example, the invention is applicable to loading of algorithmic parameters and binary codes for encrypting communication means, these elements generally being "hard" stored in the micro software of these communication means.

The invention also applies to network devices for filtering between, for example, the three domains "avionic", "maintenance" and "cabin" of an aircraft. In this case, the filtering parameters and algorithms of these filtering devices or "gateways" connecting the three equipment domains are loaded securely in the device, while guaranteeing great updating flexibility.

In one embodiment, the said secure processing comprises the secure loading of operating data from an external loading server, and the said connection and authentication are executed prior to loading of the first operating data to be loaded. By "operating data of the on-board equipment item", there is understood here the software or application data which, when executed by the on-board equipment item, impart a new functionality thereto.

This configuration is applicable in particular to the example of FIG. 1, where the sensitive data—the PKI parameters (key and algorithms)—necessary for loading the first configuration file are recovered beforehand, after authentication, from the secure module.

In this example, the operating data, when executed in the on-board equipment item, employ the verification function for loading the subsequent "loads".

These same subsequent "loads" may also contain other operating data, such as applications dedicated to the general operation of the vehicle.

In one embodiment, the said authentication comprises exchanges of the "challenge-response" type between the secure module and the on-board equipment item. This arrangement assures effective authentication, in particular reinforced when the secure module and the on-board equipment item share a first symmetric encryption key used during exchanges of the "challenge-response" type.

In this last configuration, the micro software integrates a symmetric key and no longer an asymmetric PKI key as in the prior art. In this way the risks of intervention necessary on the on-board equipment in order to modify these keys are appreciably reduced. In fact, the symmetric keys are more robust and safer than the asymmetric keys employed traditionally, for example in the PKI infrastructure.

In addition, the life cycle of these symmetric keys is substantially similar to and even longer than that of a vehicle, such as an aircraft. In this way the probability of not having to intervene at all in the on-board equipment item during the entire life of the aircraft is increased.

According to a particular characteristic of the invention, the on-board equipment item shares a second symmetric encryption key with a second secure module, and the method comprises a step of authenticating the second secure module with the on-board equipment item with the aid of the said second symmetric key, for example by a "challenge-response" mechanism. By the presence of two symmetric keys, each permitting strong authentication of secure modules, there is provided easy management of symmetric keys, because one can serve as the administration key while the other is used as the usage key.

In particular, this step of authentication with the aid of the second symmetric key can follow the failure of a first step of authentication of the second secure module with the aid of the first symmetric (usage) key. That makes it possible to automate the authentication process initiated by the micro software in the on-board equipment item: first an authentication (usage) with the aid of the first symmetric key, then, in the case of failure, an authentication with the aid of the second symmetric key (administration).

In particular, it is provided that the said first symmetric key is stored in a rewritable memory zone of the on-board equipment item, and the method comprises, in the case of positive authentication of the second module, an update of the said first symmetric key by at least one datum contained in the second secure module. The result is easy management of symmetric usage keys, without hardware intervention and a new certification cycle. In fact, the replacement of one binary string corresponding to one value by another binary string is not considered to be a major modification of the micro software, and it does not necessitate re-certification. It is mainly the binary code representative of an algorithm and capable of being executed that requires such re-certification in the case of modification.

In a particular embodiment, the symmetric keys are keys derived from a master encryption key. These derived keys are also known as "differentiated keys".

The use of a master key in a key-generating center (which must be trustworthy) and of derived keys at the level of on-board equipment items offers numerous advantages, such as:
  the holder of the master key manages only a single key, whose use is very restricted, therefore with little risk of being compromised. Because of this fact, it can be allocated a crypto-period identical to the useful life of the vehicle (such as an aircraft);
  it is easy to regenerate a differentiated key in case of need;
  it is possible to revoke only the key of one user (such as an airline company operating an aircraft) in the event that a usage key becomes compromised, for example by loss of a secure module. In this way it is not necessary to revoke all keys of the system;
  it is easy to generate, via the same plan, differentiated administration keys making it possible to be authenticated as administrator of the on-board equipment item, and to replace, in safe manner, a usage key revoked from an on-board equipment item.

In one embodiment, the secure loading referred to in the foregoing comprises the verification, by digital signature, of the origin and integrity of the operating data to be loaded.

In particular, only the first data to be loaded are verified by means of sensitive data, these first data comprising configuration data capable of configuring the said on-board equipment item for secure loading of following operating data. For example, these configuration data comprise PKI information items used at the software level to secure (by digital signature verification) loading of subsequent compiled operating data.

This configuration is applicable in particular to the example of FIG. 1, since the configuration data of the first "load" make it possible to employ the process of loading and verifying the subsequent files to be loaded.

In one embodiment, the said sensitive data comprise encryption parameters of a public key infrastructure. By virtue of this arrangement, it is possible to deploy, for less expense, the same security infrastructure over a large fleet of vehicles in which an equipment item pertaining to this embodiment is installed, and to do so despite a large number of participants in this fleet. In the aeronautics sector, there is in particular a large number of airline companies that use aircraft provided with the same type of equipment item according to the invention. In particular, the said information items comprise at least one certificate, one hash algorithm and one signature algorithm.

In one embodiment, the said authentication is conducted automatically by the said micro software upon detection of the connection with the secure module, and a positive authentication automatically triggers secure loading of operating data. In this configuration, loading of data (first configuration file) is rendered totally automatic, meaning it is not handicapped compared with the prior art mechanisms, where all of these operations are directly integrated into the on-board micro software.

According to a particular characteristic, in the case of positive authentication the said on-board equipment item reads the sensitive data from the said secure module to execute secure loading.

As a variant, the control of security of loading of data is effected by the said secure module. In this configuration the micro software is simplified even more, since the signature verification tools are stored and executed in the secure module. The on-board equipment item takes over again once the first configuration file has been loaded.

In one embodiment, the said secure module is a secure token, also referred to as "crypto token". In particular, it may be a secure chip card or a secure USB key.

Correlatively, the invention also relates to an on-board equipment item provided with a micro software program that, during power-up of the on-board equipment item, can be executed to carry out a secure processing by using sensitive security data, the micro software comprising means capable of establishing, by authentication, a connection with an external secure module comprising the said sensitive security data necessary for the said processing, so as to provide the said micro software with the said sensitive security data for subsequent execution of the said secure processing.

In particular, the authentication means comprise a first symmetric key stored in a rewritable memory of EEPROM type (electrically erasable programmable read-only memory), and a second symmetric key integrated into the binary code of the said micro software. In this way management of (first) usage keys with the aid of (second) administration keys is made possible.

Optionally, the equipment item may comprise means relating to the method characteristics presented hereinabove.

The invention also relates to a system comprising an on-board equipment item such as described hereinabove and a secure module provided to be connected to the said on-board equipment item, the secure module comprising the said sensitive security data and symmetric key authentication means. The authentication means may in particular comprise software means of the "challenge-response" type.

In particular, in the secure module, the authentication means are stored in a memory space that is write/read-protected, and the said sensitive security data are stored in a memory space that is merely write-protected.

In this configuration, the elements permitting safe authentication of the module are confined under protection while the sensitive data useful for the secure processing, such as loading of the first configuration file, can be left accessible for read mode, since they are sensitive only as regards integrity (hence write protection) and not as regards confidentiality.

The invention also relates to an aircraft comprising an equipment item such as presented hereinabove.

Optionally, the aircraft and the system may comprise means relating to the equipment item characteristics presented hereinabove.

BRIEF DESCRIPTION OF THE DRAWINGS

Other features and advantages of the invention will become more apparent in the description hereinafter, illustrated by the attached drawings, wherein.

DETAILED DESCRIPTION OF THE INVENTION

The embodiments detailed hereinafter are described in relation to the secure loading of initial configuration files ("first loads") of an equipment item on board an aircraft with the aid of PKI parameters permitting verification of digital signatures of these files.

Nevertheless, in addition to the injection of PKI parameters into the on-board equipment item, the invention can be used to inject any other type of sensitive data into an equipment item: filtering parameters and algorithms, user passwords, configuration files of security equipment items, etc.

Figure 1:
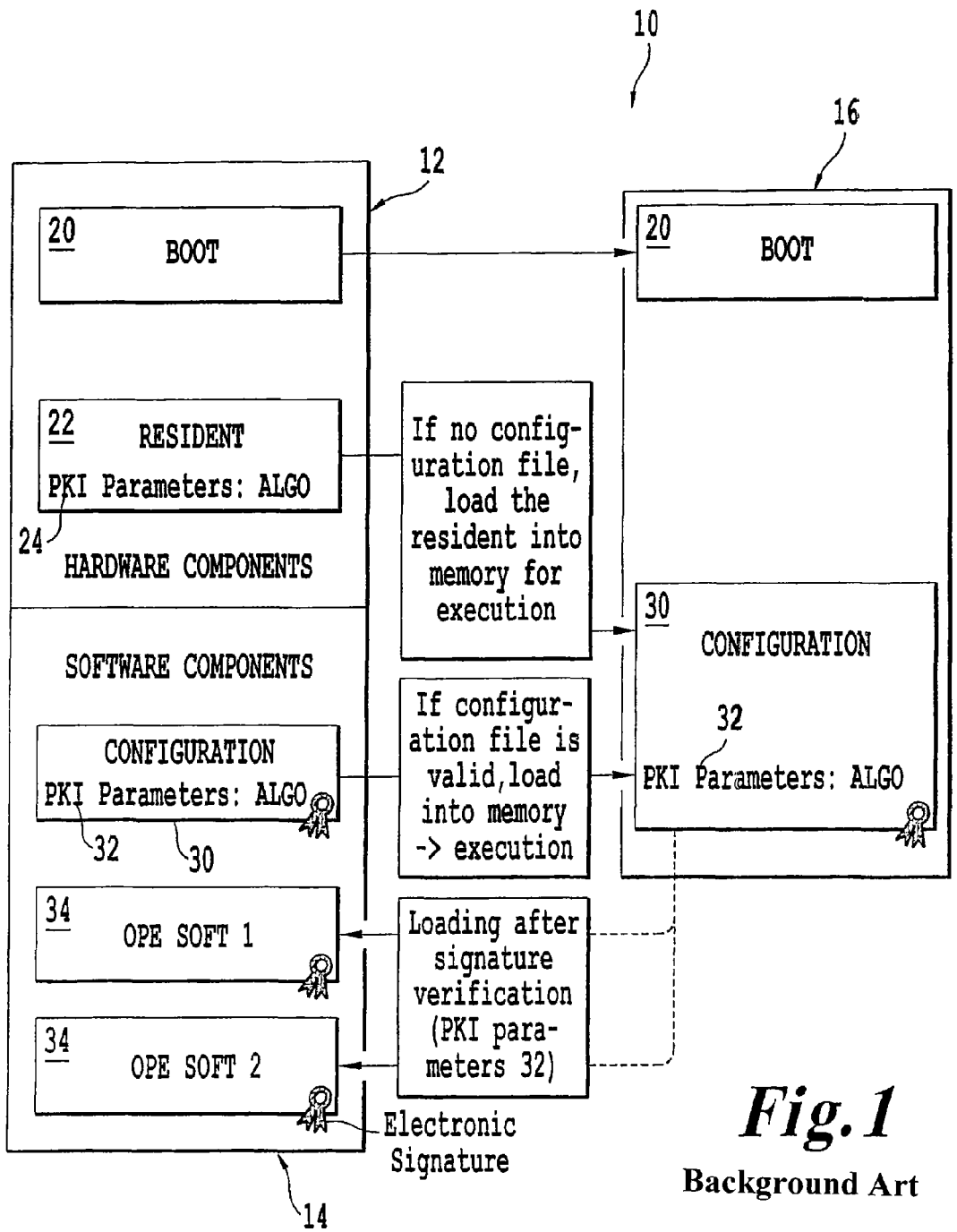
FIG. 1 represents a prior art system.
Figure 2:
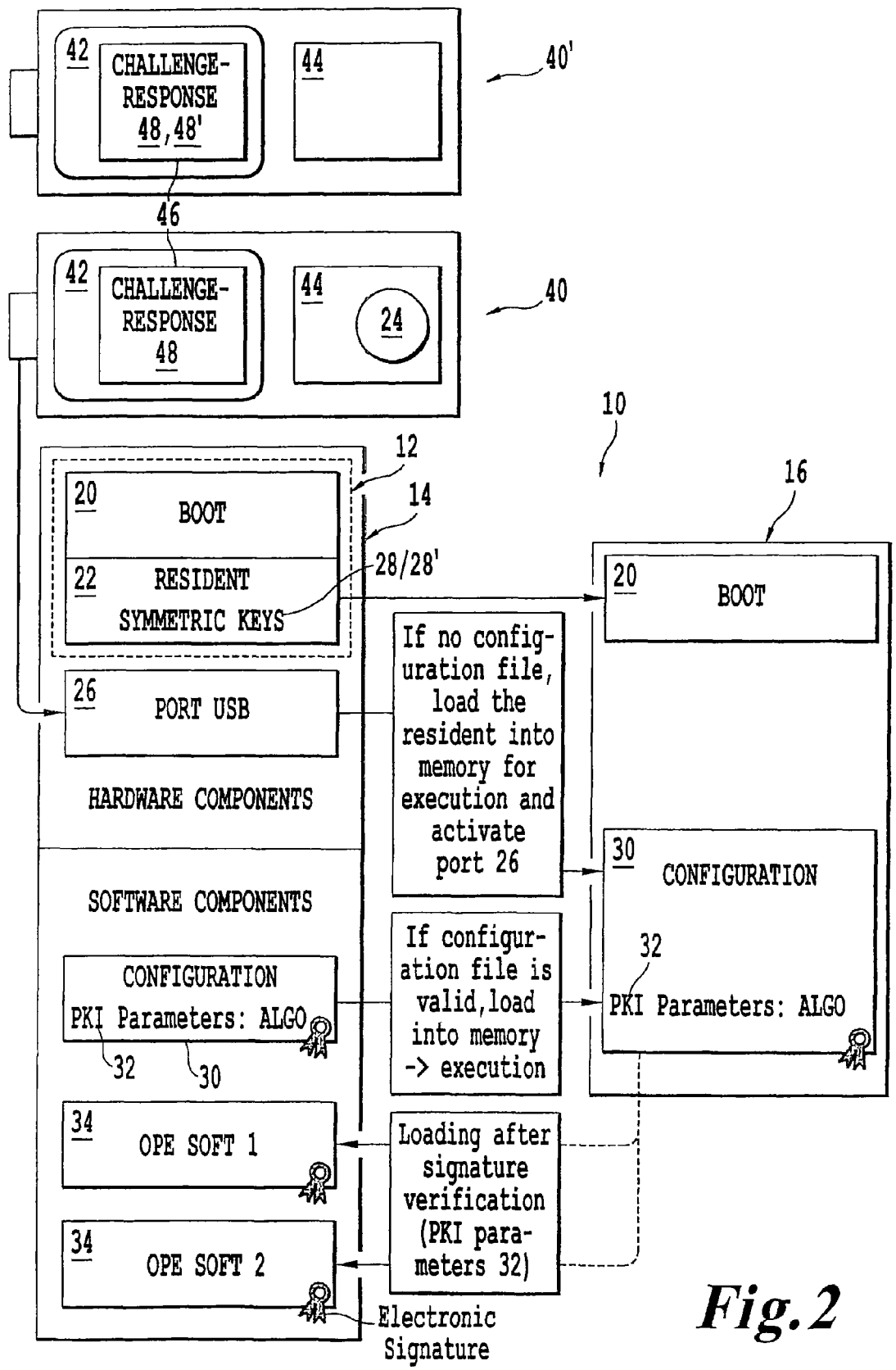
FIG. 2 represents an example of a system according to the invention.

FIG. 2 shows an embodiment of the invention taking up certain elements of FIG. 1, under identical references.

In this case, on-board equipment item 10 has a specific communication port 26 permitting the secure exchange of data with a secure external medium 40, preferably of removable type such as a secure USB token (or USB crypto token, USB=universal serial bus) or a chip card. By way of example, a physical communication port of USB or IEEE 1394 type may be used. Alternatively a wireless radiofrequency communication may also permit secure communication.

In equipment item 10, resident software 22 comprises traditional software means for communication via a USB port 26 comprising in particular a symmetric usage key 28 and a symmetric administration key 28' integrated directly into the binary code of resident software 22. Nevertheless, symmetric usage key 28 is stored in binary format in a rewritable memory zone of EEPROM type.

These communication means are capable of employing a mechanism of authentication by challenge-response via port 26 (also known as "challenge-response" according to English terminology) with the aid of one of symmetric keys 28, 28'.

In addition, resident software 22 comprises a binary code of the software tool for verification of electronic signatures in a PKI infrastructure (also known as "Digital Signature Checker" or DSC), which makes it possible to verify, with the aid of sensitive software data of the PKI parameter type, the origin and integrity of a first configuration file 30.

Illustrated secure USB token 40 is provided with an internal secure module 42, which conforms, for example, with the Common Criteria or with the FIPS 140-2 standard, and with a storage memory 44 Secure module 42 also comprises a secure memory 46.

In these two memories the data are stored in encrypted form. Storage memory 44 is write-protected only. It can be accessed in write mode only by entering one or more personal codes, also known as PIN codes (personal identification number). The sensitive software data, in this case PKI parameters 24 used by the DSC tool of resident software 22 to verify the electronic signature of first configuration file 30, are stored in this storage memory 44, and comprise a root certificate, a hash algorithm and a signature algorithm (all three to execute the operations of calculating and verifying digital signatures).

Since, for the intended application, PKI parameters 24 are sensitive only as regards integrity and not as regards confidentiality, it is advantageous that this memory zone 44 not be read-protected. In fact, when this memory zone 44 is read by resident software 22 to recover the PKI parameters, it would be necessary, if memory zone 44 were read-protected, to integrate the PIN codes for access to this memory in the binary code of resident software 22. Thus resident software 22 and management of codes for access to this memory 44 are simplified.

Nevertheless, write-protection of zone 44 may be envisioned, in which case it is appropriate to integrate the PIN access code in the binary code of resident software 22, as indicated hereinabove.

Secure memory 46 in module 42 is write/read-protected. Access thereto in one of the two modes is protected by one or more PIN codes, which may be different from those permitting access to memory zone 44.

In this memory zone 46 there are stored symmetric usage key 48 corresponding to key 28 as well as software communication means for authentication by challenge-response. In this way there are produced secure usage tokens 40 and secure administration tokens 40', the use of which will be seen hereinafter (especially in FIGS. 6 and 7).

By virtue of the challenge-response mechanism and symmetric key 48, secure token 40, when connected to port 26 of equipment item 10, establishes secure communication with resident software 22, as will be seen hereinafter.

The PIN code for access to secure zone 46 is known as "administrator PIN code". It is held by the supplier of on-board equipment item 10 and/or by the entity that generated symmetric keys 28/28'/48/48'.

The PIN code for access to storage zone 44 is known as "user PIN code". It is configured by the user, and it permits the latter, from a host station receiving USB token 40, to access memory zone 44 and to write (for an update, for example) "PKI" parameters 24 necessary for verification of electronic signatures of first configuration file 30.

The sharing of at least one secret element 28/48 (in this case the symmetric keys) between one or more removable media 40 and target equipment item 10 permits strong identification of these removable media 40 and therefore makes it possible to detect possible unauthorized media.

It is noted that the symmetric keys are not divulged but are merely used by the challenge-response mechanism. Only one response to the "challenge-response" is transmitted to the other entity participating in authentication.

A second type of secure token is used for the invention in the manner explained hereinafter. This secure token 40' is known as administration token and is used to update symmetric usage key 28 within equipment item 10.

This token 40' is similar to secure token 40', with the exception that it does not store PKI parameters 24 (because its purpose is to update key 28 and not to furnish sensitive data 24), and that it stores symmetric administration key 48', with which it can be identified in on-board equipment item 10, in its secure module 42.

For its update function, this token 40' also stores new usage key 28, which is injected appropriately into equipment item 10, in secure memory 46.

By virtue of its function, this administration key 40' does not necessarily store PKI parameters 24.

The use of a symmetric key for the process of authentication of media 40/40' in target equipment items 10 presents different advantages:

intrinsic cryptographic qualities permitting, for identical key length, a useful key life (or crypto period) longer than that allowed by the asymmetric models of known solutions. In this way, since resident software 22 integrates the symmetric key directly into its binary code, this software does not have to be renewed or modified as often;

superior performances compared with the asymmetric solutions. In particular, the symmetric algorithms are much faster than those used in asymmetric cryptography;

the possibility of using "master keys" to generate "derived keys" or "differentiated keys". The latter are generated locally from the same master key for use by distinct mechanisms or environments. In the present aeronautical example, the keys will be differentiated by airline company, for example. It is noted that only derived or differentiated symmetric keys 28/48 are stored in on-board equipment items 10 and/or media 40/40';

the possibility of strong authentication:
of data 34 injected by "message authentication code";
of media 40 by "challenge-response".

Figure 3:
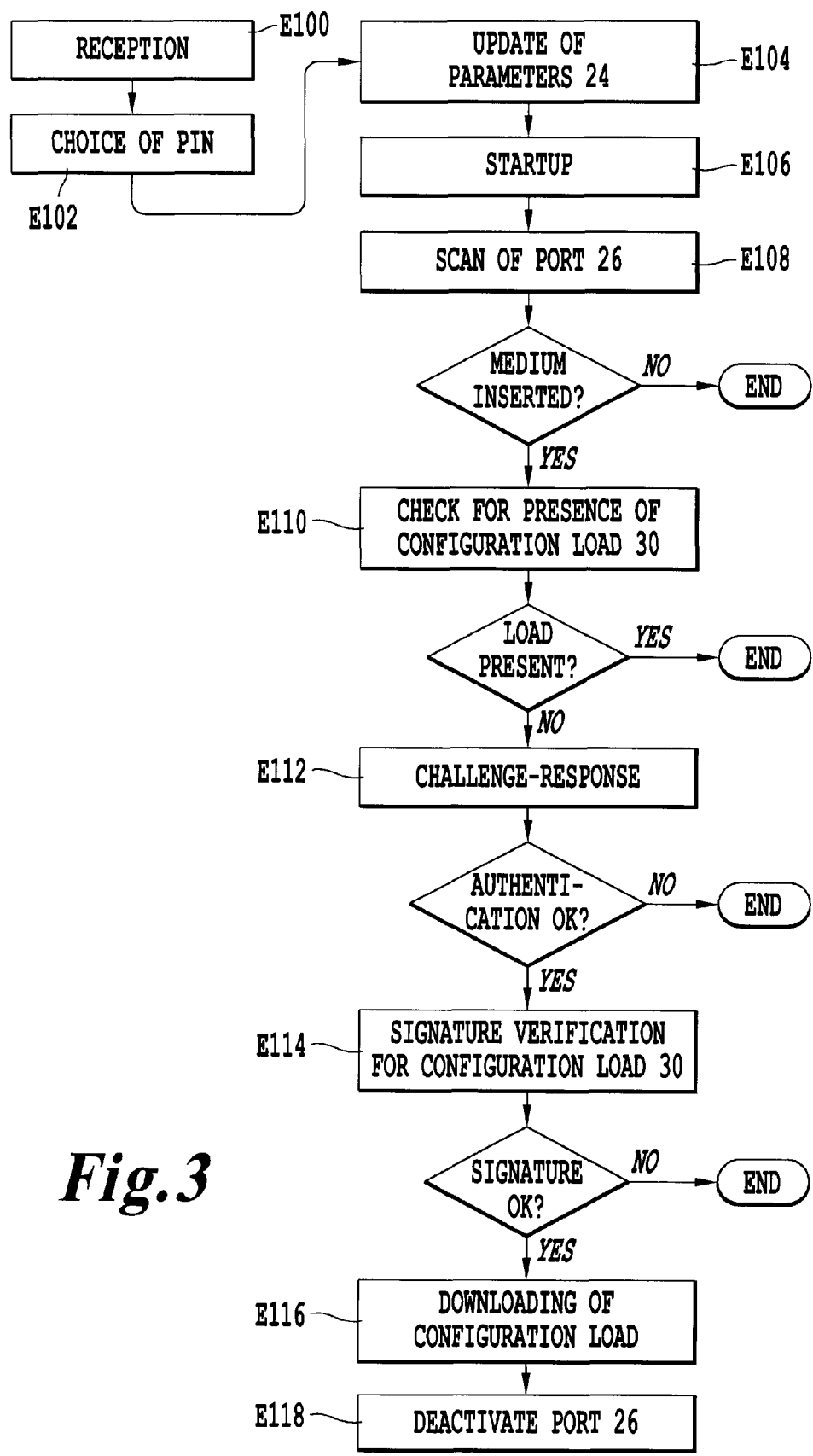
FIG. 3 illustrates, in the form of a logic diagram, the operation of the system of FIG. 2 during an initialization phase.

Referring to FIG. 3, there now is described the operation of on-board equipment item 10 during its use.

In step E100, the user, in this case an airline company receiving an airplane, receives on-board equipment item 10 and a secure usage token 40.

In step E102, the user chooses a PIN code permitting writing of PKI parameters 24 in storage memory zone 44.

In step E104, the user connects token 40 to a workstation, then updates PKI parameters 24 in memory 44 if necessary, by accessing this memory by entering the PIN code chosen just before. In particular, the airline company writes PKI parameter 24 during first use of token 40.

In step E106, secure token 40 is connected to USB port 26 of on-board equipment item 10, which is then turned on.

In step E108, boot software 20 is executed, and it scans external USB port 26 in order to determine the presence of a connected medium.

At this stage, if a secure token 40 was not detected, on-board equipment item 10 would indicate that it cannot continue the process.

In the present case, equipment item 10 detects the presence of secure token 40.

In step E110, boot software 20 checks for the presence of first configuration file 30 in memory 14 of equipment item 10. Since the system is being initialized, this file 30 is not present. If a file 30 was written in memory 14 during manufacture of the system, the initialization process would be terminated at this stage.

In step E112, resident software 22 is then executed, and it activates communication port 26 to launch a challenge-response exchange based on symmetric usage key 28. Secure token 40 present on USB port 26 then returns a response on the basis of symmetric usage key 48, which response is verified by the resident software according to the traditional challenge-response mechanisms.

By virtue of this mechanism, only trusted removable media 40 are allowed to communicate with equipment item 10 and resident software 22.

If the response to the challenge is erroneous, the processing can be terminated, or a second authentication procedure can be initiated, in this case on the basis of symmetric administration keys 28748', as will be seen hereinafter, in particular to update symmetric usage key 28 in equipment item 10.

If the challenge-response is validated, then in step E114 resident software 22 recovers PKI parameters 24 stored in memory 44 and conducts a check of the origin and integrity of a first configuration file 30 at the data loader. This check is based on verification of the digital signature of file 30 with the aid of PKI parameters 24.

If the origin and integrity are valid, in step E116 first configuration file 30 is downloaded to on-board equipment item 10 and installed in a manner similar to that of the state of the art. In this way on-board equipment item 10 is provided with PKI infrastructure means 32 necessary for downloading subsequent compiled operating files 34.

The process is terminated in step E118 by deactivating communication port 26.

In this way, on-board equipment item 10 then continues its execution by traditional downloading of other "loads" 34 for operation of the system (with checking of these "loads" with the aid of PKI parameters 32 contained in first configuration file 30): for example, user data, other applications imparting functionalities to the equipment item with a view to operation of the airplane, etc.

Figure 4:
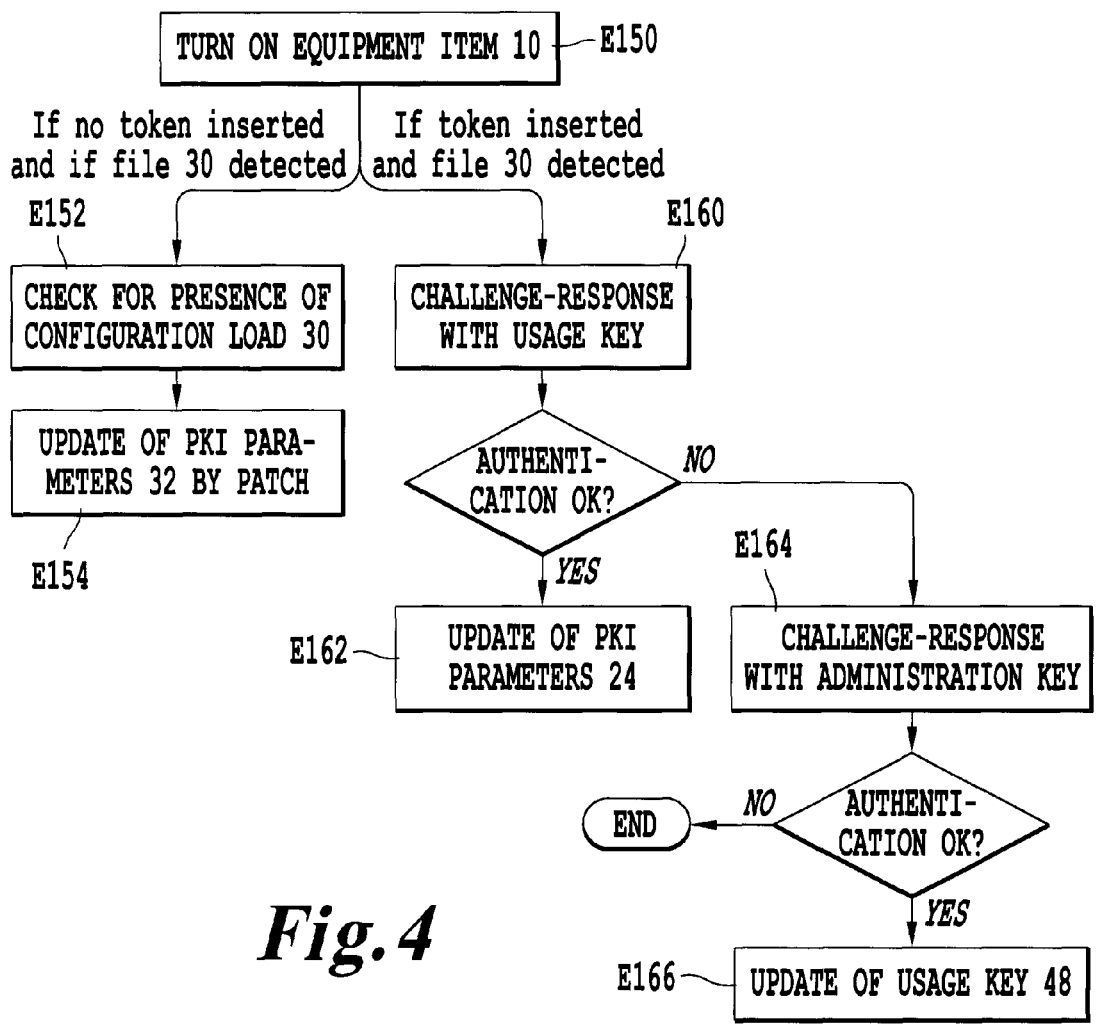
FIG. 4 illustrates, in the form of a logic diagram, the current operation of the system of FIG. 2 after initialization.

Referring to FIG. 4 there now is described the operation of on-board equipment item 10 during uses subsequent to initialization thereof. That corresponds to the traditional use of equipment item 10.

In step E150, equipment item 10 is turned on, triggering execution of boot software 20.

This software undertakes a "scan" of external port 26 and detection of the presence of first configuration file 30 in memory 14.

The traditional situation is that in which configuration file 30 containing PKI parameters 32 is present in memory and in which no secure token 26 is detected on USB port 26.

In this case, in step E152, equipment item 10 deactivates USB port 26 and proceeds traditionally to download processing files 34 after it has verified them by means of PKI parameters 32. This step comprises in particular loading of file 30 into random-access memory 16, for execution.

During the use of equipment item 10, if the digital signatures of new operating files 34 evolve from a version N to a version N+1, PKI parameters 32 necessary for verification of these signatures are updated, in step E154, by patch on first configuration file 30 in memory 14. This update is in conformity with that proposed hereinabove in association with FIG. 1 in particular, there is used a corrective file signed in version N and comprising the new PKI parameters of version N+1.

In a second case, at the end of step E150, a token 40 is detected and a first configuration file 30 is detected in memory 14. This second case corresponds in general to a need to update PKI parameters 24 necessary for verification of first configuration file 30. In this way detected token 40 integrates new PKI parameters 24 in version N+1.

In this case, in step E160, resident software 22 launches a challenge-response based on symmetric usage key 28 to secure token 40.

If the response to the challenge is correct, in step E162 equipment item 10 accesses new PKI parameters 24 in version N+1 and proceeds to update the PKI parameters in equipment item 10.

The latter is then able to verify and download a new first configuration file 30 signed in version N+1, which in the meantime will have been made available by the data loader.

It is seen here that PKI parameters 24 for downloading first file 30 are updated without hardware modification of equipment item 10.

If the response to the challenge is not correct in step E160, in step E164 resident software 22 launches a new challenge-response exchange to token 40, this time on the basis of symmetric administration key 28'. If the response to this second challenge is correct (in this case, the connected token is a secure administration token 40'), resident software 22 proceeds in step E166 to update usage key 28 stored in equipment item 10.

This situation is encountered during a sequence of replacement of the symmetric usage key (specific to an airline company), for example if it has been compromised or if a usage token 40 has been lost.

After usage key 48 has been replaced, equipment item 10 is started up again in step E150.

Figures 5, 7:
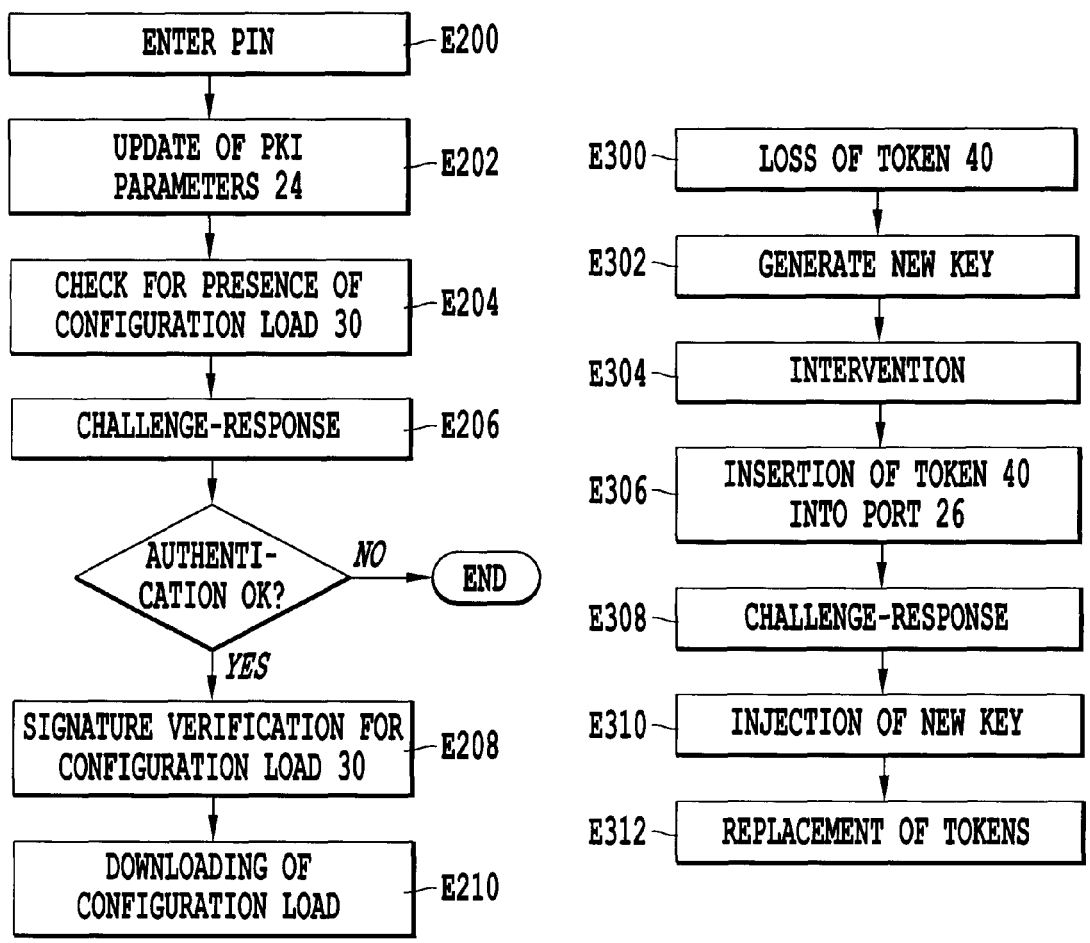
FIG. 5 illustrates, in the form of a logic diagram, the installation of a new configuration file in the system of FIG. 2.
FIG. 7 illustrates, in the form of a logic diagram, steps of management of authentication keys of FIG. 6 in the case of a compromised situation.

Interest is taken in the evolution of the electronic signature of first configuration file 30 from a version N to a version N+1, now with reference to FIG. 5, when the equipment item has been reset to zero after evolution of the digital signature.

In step E200, the user connects his secure token 40 to a host station and obtains the rights to write in memory zone 44 by entering an appropriate PIN code.

In step E202, the user updates PKI parameters 24 within memory zone 44 of token 40 and adapts them to version N+1.

In step E204, the user connects updated token 40 to port 26 of on-board equipment item 10 and turns on the latter. Boot software 20 then checks for the presence of token 40 on port 26 and for that of first configuration file 30 in memory 14. This step E204 corresponds to step E150 of FIG. 4.

In the present case, no configuration file 30 is detected, because memory 14 was erased when equipment item 10 was reset to zero.

In step E206, resident software 22 launches a challenge-response exchange to token 40 on the basis of usage key 28 in a manner similar to that described in the foregoing.

If the response to the challenge is correct, in step E208 resident software 22 recovers PKI parameters 24 of version N+1 contained in connected secure token 40 and checks the origin and integrity of available first configuration file 30 in the data loader. Of course, this electronic signature check is performed, at this stage, with the aid of the new PKI parameters in version N+1.

Configuration file 30 is then loaded in step E210. Thereafter execution is continued by verifying and downloading other operating files 34 on the basis of the PKI parameters contained in newly loaded configuration file 30.

In this way it is seen that the PKI parameters necessary for loading first configuration file 30 have been updated without affecting micro software 12. Thus removing the equipment item and modifying the binary code of resident software 22 are avoided.

Figure 6:
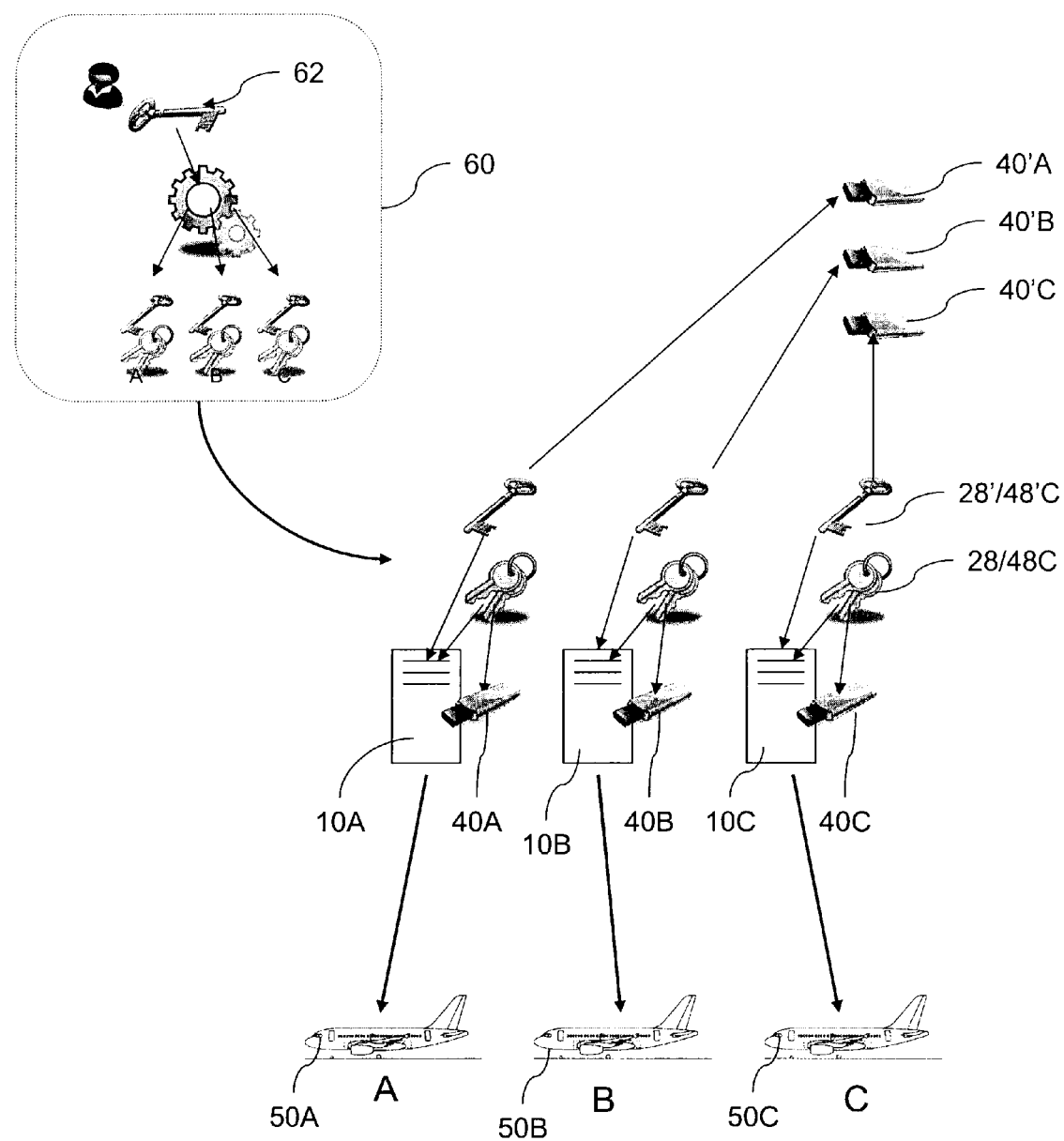
FIG. 6 illustrates the mechanism of generation of authentication keys in systems according to the invention applied to the aeronautics sector.

Referring to FIGS. 6 and 7, there now is illustrated an example of management of symmetric keys permitting strong authentication between a secure token 40 of the user and an on-board equipment item 10.

In FIG. 6 there are represented airplanes 50A, 50B and 50C belonging to the fleets of airline companies A, B and C respectively.

On each airplane 50 there is installed an equipment item (identified here as 10A, 10B, 10C according to the company) and a secure user token 40A, 40B, 40C of "cryptographic USB token" type is made available to the pilots, for example, of airplane 50. Port 26 provided on equipment items 10 conforms with the USB standard.

As seen in the foregoing, equipment item 10 and secure token 40 both integrate the same symmetric usage key 28/48 (with suffix A, B and C according to the company), which is used for authentication E160 in particular.

For each airline company there is provided a secure token 40'A, 40'B, 40'C storing symmetric administration key 48' (itself stored by equipment items 10 under reference 28'). This administration token 40' makes it possible in particular to update symmetric usage key 48 in the interior of equipment item 10 (step E168).

In FIG. 6 there is also shown a center 60 for generation of symmetric keys 28/48 and 28'/48' by derivation from a master key 62.

Master key 62 is a 256-bit "symmetric" key and, by traditional mechanisms, makes it possible to generate differentiated usage keys 28/48A,B,C and administration keys 28'/48'A,B,C for each airline company A, B, C. The length of these differentiated keys may be adapted to the local legislation in force, such as 128-bit keys.

During their transfer between generating center 60 and the supplier, these keys 28/48/28'/48' are protected by traditional cryptographic means (VPN tunnel, PKI, etc.). Particular confinement measures are adopted to assure that these keys will not be compromised during their manipulation at the supplier level: for example, a personnel training procedure is established, appropriate infrastructures are used, computer hardware is dedicated to this task, etc.

The authentication between equipment item 10 and tokens 40, 40' is based on "challenge-response" exchanges using block encryption (AES—advanced encryption standard).

Referring to FIG. 7 there now is illustrated the management of compromising of keys following the loss of a secure token 40 containing differentiated usage key 48 of a company.

It is noted that FIG. 7 does not deal with the compromising of master key 62, which is highly improbable in practice. Nevertheless, it is pointed out that the entire system is compromised in this case, and a new master key 62 and new derivative keys 28/48/28'/48' must be produced by generating center 60. In particular, the establishment of new derivative keys is effected directly in all secure tokens 40, 40' of the companies and by corrective action ("retrofit" according to English terminology) for equipment items 10 installed on board airplanes 50.

Concerning the loss of a secure token 40 of a company, the user declares the loss of this token 40 in step E300.

In step E302, generating center 60 generates a new differentiated usage key 48 for the company.

In step E304, an intervention of an administrator in airplanes 50 affected by this loss of token 40 is triggered.

In step E306, the administrator inserts his secure token 40' storing in particular newly generated usage key 48 into USB port 26 of on-board equipment item 10.

In step E308, an authentication by challenge-response to equipment item 10 is triggered by administration token 40', on the basis of symmetric administration key 28'/48'.

Once authentication has taken place, in step E310 the administrator injects new differentiated usage key 28 of the company into equipment item 10. This injection consists in overwriting with new key 28 in the EEPROM memory zone of equipment item 10 dedicated to storage of the usage key. These operations are driven in particular by resident software 22.

Finally, in step E312, secure user tokens 40 of the affected company are replaced by tokens comprising new differentiated usage key 28.

Furthermore, in the case that differentiated administration key 28' or 48' of a company has been compromised, only equipment items 10 of that company are impacted. A new administration key for the benefit of the company is then generated from the same master key 62. Establishment of new key 28748' is then effected by changing secure administration tokens 40' and by correcting (retrofitting) for equipment items 10 installed on board airplanes 50.

The foregoing examples are merely embodiments of the invention, which is not limited thereto.

The invention is also applicable when on-board equipment item 10 is not equipped with permanent storage memory 14. In this case, upon each restart, equipment item 10 loads first configuration file 30 then the other operating files 34.

Furthermore, the case in which verification of first configuration file 30 was effected by resident software 22 with the aid of PKI parameters 24 recovered from secure token 40 was envisioned hereinabove. However, it is conceivable that the DSC software tools for signature verification are located on secure token 40. These tools are then executed by secure module 42. This functionality avoids a hardware modification of on-board equipment item 10 in the case of evolution of the verification software tool.

Likewise, the embodiments hereinabove describe on-board downloading of operating files. Nevertheless, it is possible to envision the invention for loading sensitive data such as journal files (or "logs" according to English terminology) from on-board the vehicle to a ground station.

The invention, although described hereinabove in an aeronautics application, may be applied to any type of vehicle provided with on-board equipment items, such as an automobile or a train.

The invention claimed is:

1. A method for operating an equipment item on-board an aircraft, the on-board equipment item being provided with micro software configured to be executed during power-up of the on-board equipment item in order to achieve secure processing by use of sensitive security data of public-key-infrastructure (PKI) encryption parameter type for checking digital signature, the secure processing including checking a digital signature of operating data from an external loading server using the sensitive security data of PKI encryption parameter type and secure loading the operating data from the external loading server through a communication network, in case of positive signature check, the method comprising:
   connecting an external secure module separate from the external loading server, the external secure module including the sensitive security data of PKI encryption parameter type necessary for the secure processing to the on-board equipment item, the on-board equipment item including a certified hardware component that has the micro software integrated with the certified hardware component; and
   authenticating the external secure module by the micro software in such a way as to furnish the sensitive security data of PKI encryption parameter type, once the sensitive security data of PKI encryption parameter type has been furnished to the micro software, for the secure processing to check the digital signature of the operating data using the sensitive security data of PKI encryption parameter type and to load the operating data from the external loading server in case of positive signature check.

2. The method according to claim 1, wherein the authentication includes exchanges of a "challenge-response" type between the external secure module and the on-board equipment item, and the external secure module and the on-board equipment item share a first symmetric encryption key used during exchanges of the "challenge-response" type.

3. The method according to claim 2, wherein the on-board equipment item shares a second symmetric encryption key with a second secure module, and the method includes a step of authenticating the second secure module with the on-board equipment item with aid of the second symmetric encryption key.

4. The method according to claim 3, wherein the first symmetric encryption key is stored in a rewritable memory zone of the on-board equipment item, and the method includes, in a case of positive authentication of the second secure module, updating the first symmetric encryption key by at least one datum contained in the second secure module.

5. The method according to claim 2, wherein the first symmetric encryption keys of the external secure module and the on-board equipment item are keys derived from a master encryption key.

6. The method according to claim 1, wherein the secure loading includes verification, by a digital signature, of an origin and integrity of the operating data to be loaded.

7. The method according to claim 6, wherein only first operating data to be loaded are verified with aid of the sensitive security data of PKI encryption parameter type, the first operating data including configuration data that configures the on-board equipment item for secure loading of following operating data.

8. The method according to claim 1, wherein the authentication is conducted automatically, by the micro software, upon detection of the connection with the external secure module, and a positive authentication automatically triggers secure loading of the operating data.

9. The method according to claim 8, wherein, in the case of positive authentication, the on-board equipment item reads the sensitive security data of PKI encryption parameter type from the external secure module to execute the secure loading.

10. The method according to claim 8, wherein the control of security of loading of the operating data is effected by the external secure module.

11. The method according to claim 1, wherein the sensitive security data of PKI encryption parameter type include encryption parameters of a public key infrastructure.

12. The method according to claim 11, wherein the information items of the public key infrastructure include at least one certificate, one hash algorithm and one signature algorithm.

13. The method according to claim 1, wherein the external secure module is a secure token.

14. An equipment item on-board an aircraft comprising:
a memory storing a micro software program configured to be executed during power-up of the on-board equipment item, the on-board equipment item including a certified hardware component that has the micro software integrated with the certified hardware component, wherein modification of the micro software requires recertification of the certified hardware component, and the micro software program is configured to execute a secure processing operation by using sensitive security data of public-key-infrastructure (PKI) encryption parameter type for checking digital signature, the secure processing including checking a digital signature of operating data from an external loading server using the sensitive security data of PKI encryption parameter type and secure loading the operating data from the external loading server through a communication network, in case of positive signature check,
wherein the micro software establishes, by authentication, a connection with an external secure module separate from the external loading server, the external secure module including the sensitive security data of PKI encryption parameter type necessary for the secure processing, in such a way that the sensitive security data of PKI encryption parameter type is furnished, once the sensitive security data of PKI encryption parameter type has been furnished to the micro software, for the secure processing to check the digital signature of the operating data using the sensitive security data of PKI encryption parameter type and to load the operating data from the external loading server in case of positive signature check.

15. A system comprising the on-board equipment item according to claim 14, wherein the external secure module is configured to be connected to the on-board equipment item, the external secure module including the sensitive security data, stored in a memory space that is only write-protected, and symmetric key authentication means for symmetric key authentication, stored in a memory space that is write/read protected.

16. An aircraft comprising the equipment item according to claim 14.

17. The on-board equipment item of claim 14, wherein the authentication includes exchanges of a "challenge-response" type between the external secure module and the on-board equipment item, and the external secure module and the on-board equipment item share a first symmetric encryption key used during exchanges of the "challenge-response" type.

18. The on-board equipment item of claim 17, wherein the on-board equipment item shares a second symmetric encryption key with a second secure module, and the second secure module is authenticated with the on-board equipment item with aid of the second symmetric encryption key.

19. The on-board equipment item of claim 18, wherein the first symmetric encryption key is stored in a rewritable memory zone of the on-board equipment item, and in a case of positive authentication of the second secure module, the first symmetric encryption key is updated by at least one datum contained in the second secure module.

20. A method for operating an equipment item on-board an aircraft, the on-board equipment item being provided with micro software configured to be executed during power-up of the on-board equipment item in order to achieve secure processing by use of sensitive security data, the method comprising:
connecting an external secure module including the sensitive security data necessary for the secure processing to the on-board equipment item, the on-board equipment item including a certified hardware component that has the micro software integrated with the certified hardware component, wherein modification of the micro software requires recertification of the certified hardware component;
authenticating the external secure module by the micro software in such a way as to furnish the micro software with the sensitive security data for subsequent execution of the secure processing, the authenticating including exchanges of a "challenge-response" type between the external secure module and the on-board equipment item, the external secure module and the on-board equipment item share a first symmetric encryption key used during the exchanges of the "challenge-response" type, and the on-board equipment item shares a second symmetric encryption key with a second external secure module; and
authenticating the second external secure module with the on-board equipment item with aid of the second symmetric encryption key.

* * * * *